United States Patent
Sebastian et al.

(10) Patent No.: US 9,555,689 B2
(45) Date of Patent: Jan. 31, 2017

(54) ADAPTIVE AUTOMATIC CLIMATE CONTROL FOR VEHICLES

(75) Inventors: Bibin Sebastian, Kerala State (IN); Todd M. Tumas, Taylor, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 141 days.

(21) Appl. No.: 13/473,357

(22) Filed: May 16, 2012

(65) Prior Publication Data

US 2013/0306297 A1   Nov. 21, 2013

(51) Int. Cl.
*B60H 1/00* (2006.01)

(52) U.S. Cl.
CPC . *B60H 1/00971* (2013.01); *B60H 2001/00992* (2013.01)

(58) Field of Classification Search
None
See application file for complete search history.

(56) References Cited

U.S. PATENT DOCUMENTS

| | | | |
|---|---|---|---|
| 5,511,724 A * | 4/1996 | Freiberger et al. | 236/49.3 |
| 6,644,558 B2 * | 11/2003 | Ohga et al. | 236/49.3 |
| 7,246,499 B2 * | 7/2007 | Pham et al. | 62/161 |
| 7,346,440 B2 * | 3/2008 | Ichishi et al. | 701/36 |
| 8,083,575 B2 | 12/2011 | Kim | |
| 2003/0160104 A1 * | 8/2003 | Kelly et al. | 236/91 C |
| 2004/0003616 A1 | 1/2004 | Kadle et al. | |
| 2004/0118555 A1 * | 6/2004 | Fristedt et al. | 165/202 |
| 2007/0299560 A1 | 12/2007 | LaHue et al. | |
| 2009/0301116 A1 * | 12/2009 | Nathan et al. | 62/208 |
| 2011/0166711 A1 * | 7/2011 | Markowitz et al. | 700/278 |
| 2012/0045102 A1 * | 2/2012 | Lung | 382/117 |

OTHER PUBLICATIONS

The State Intellectual Property Office of the People's Republic of China, Office Action for Chinese Patent Application No. 201310181391.7 mailed Feb. 28, 2015.

* cited by examiner

*Primary Examiner* — Helal A Algahaim
*Assistant Examiner* — Paul Castro
(74) *Attorney, Agent, or Firm* — Lorenz & Kopf, LLP

(57) ABSTRACT

Methods, systems, and vehicles are provided for providing adaptive automatic climate control functionality for a vehicle. A sensor is configured to detect when a manual override of an automatic climate control feature of a vehicle has occurred. A processor is coupled to the sensor, and is configured to initiate the automatic climate control feature for the vehicle and adjust a calibration of the automatic climate control feature when the manual override has been detected.

11 Claims, 7 Drawing Sheets

ADAPTIVE AUTOMATIC CLIMATE CONTROL FOR VEHICLES

TECHNICAL FIELD

The present disclosure generally relates to the field of vehicles and, more specifically, to methods and systems for adaptive automatic climate control functionality for vehicles.

BACKGROUND

Many vehicles include automatic climate control functionality. For example, certain vehicles include automatic control of an air conditioning/heating unit of the vehicle and/or of climate control seating for occupants of the vehicle. However, such automatic climate control may not always correspond to preferences of every driver or vehicle occupant.

Accordingly, it is desirable to provide improved methods for adapting automatic climate control functionality of vehicles in order to tailor the automatic climate control functionality to meet the needs of the vehicle occupants. It is also desirable to provide improved systems and vehicles that provide such adaptive automatic climate control functionality. Furthermore, other desirable features and characteristics of the present invention will be apparent from the subsequent detailed description and the appended claims, taken in conjunction with the accompanying drawings and the foregoing technical field and background.

SUMMARY

In accordance with an exemplary embodiment, a method is provided. The method comprises the steps of initiating an automatic climate control feature for a vehicle, detecting whether a manual override of the automatic climate control feature has occurred, and adjusting a calibration of the automatic climate control feature when the manual override has been detected.

In accordance with another exemplary embodiment, a system is provided. The system comprises a sensor (such as a sensor of a user input climate control panel) and a processor. The sensor is configured to detect when a manual override of an automatic climate control feature of a vehicle has occurred. The processor is coupled to the sensor, and is configured to initiate the automatic climate control feature for the vehicle and adjust a calibration of the automatic climate control feature when the manual override has been detected.

In accordance with a further exemplary embodiment, a vehicle is provided. The vehicle comprises a body, a drive system, and an environmental control system. The drive system is disposed inside the body. The environmental control system is disposed inside the body. The environmental control system comprises a sensor (such as from a user input climate control panel) and a processor. The sensor is configured to detect when a manual override of an automatic climate control feature of a vehicle has occurred. The processor is coupled to the sensor, and is configured to initiate the automatic climate control feature for the vehicle and adjust a calibration of the automatic climate control feature when the manual override has been detected.

DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the disclosure or the application and uses thereof. Furthermore, there is no intention to be bound by any theory presented in the preceding background or the following detailed description.

Figure 1:
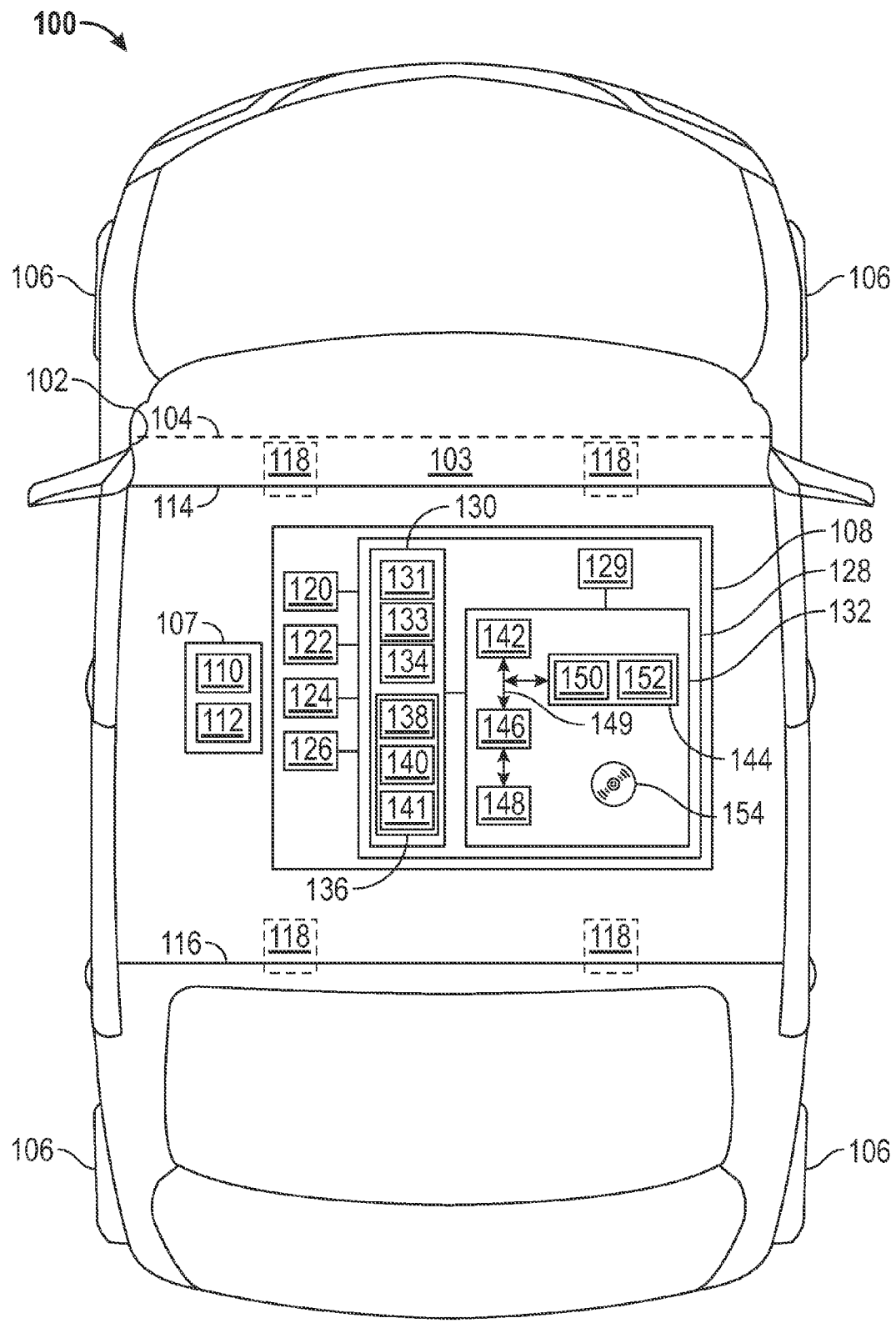
FIG. 1 is a functional block diagram of a vehicle that includes an environmental control system with adaptive automatic climate control functionality, in accordance with an exemplary embodiment.

FIG. 1 illustrates a vehicle 100, such as an automotive vehicle, according to an exemplary embodiment. The vehicle 100 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD).

The vehicle 100 includes a body 102 that is arranged on a chassis 104. The body 102 substantially encloses the other components of the vehicle 100. The body 102 and the chassis 104 may jointly form a frame.

As depicted in FIG. 1, the vehicle 100 also includes a plurality of wheels 106, a drive system 107, and an environmental control system 108. The wheels 106 are each rotationally coupled to the chassis 104 near a respective corner of the body 102 to facilitate movement of the vehicle 100. In a preferred embodiment, the vehicle 100 includes four wheels, although this may vary in other embodiments (for example for trucks and certain other automotive vehicles).

The drive system 107 is mounted on the chassis 104, and drives the wheels 106. The drive system 107 preferably comprises a propulsion system. In certain exemplary embodiments, the drive system 107 comprises a combustion engine 110 and/or an electric motor/generator, coupled with a transmission 112 thereof. In certain embodiments, the drive system 107 may vary, and/or two or more drive systems 107 may be used. By way of example, the vehicle 100 may also incorporate any one of, or combination of, a number of different types of electrical propulsion systems, such as, for example, a gasoline or diesel fueled combustion engine, a "flex fuel vehicle" (FFV) engine (i.e., using a mixture of gasoline and alcohol), a gaseous compound (e.g., hydrogen and/or natural gas) fueled engine, a combustion/electric motor hybrid engine, and an electric motor.

The environmental control system 108 uses outside air to heat and cool the vehicle 100, and to provide climate controlled seats 118 for a front row 114 and/or back row 116 of the vehicle 100. In a preferred embodiment, the environmental control system 108 comprises an air conditioning/heating system for the vehicle 100 that includes a compressor 120, a heat exchanger 122, a fan 124, a climate control seat delivery mechanism 126, and a controller 128. The compressor 120 compresses air from within a cabin 103 of the vehicle 100 (i.e., an interior portion of the vehicle 100 within the body 102 in which occupants may be seated) and/or air from outside the vehicle 100 to provide cooled air for the cabin 103 when air conditioning and/or other cooling features are desired. The heat exchanger 122 compresses air from within the cabin 103 and/or air from outside the vehicle 100 to provide heated air for the cabin 103 when heated air circulation and/or other heating features are desired. The fan 124 circulates heated or cooled air throughout the cabin 103. The climate control seat delivery mechanism 126 provides heating or cooling for climate controlled seats 118, for example as depicted in a front row 114 and/or a rear row 116 of the vehicle 100 (for example, by blowing heated or cooled air proximate the climate controlled seats 118 and/or via a heating element proximate the climate controlled seats).

The controller 128 is coupled to the compressor 120, the heat exchanger 122, the fan 124, and the seat delivery mechanism 126, and controls operation thereof via an adaptive automatic climate control feature that is tailored to the specific preferences of an occupant (preferably the driver) of the vehicle 100. The controller 128 preferably performs these and other functions in implementing the steps of the process 200 described further below in connection with FIGS. 2-11.

As depicted in FIG. 1, the controller 128 is preferably disposed inside the body 102 of the vehicle 100, and includes a communication system 129, a sensor array 130, and a computer system 132. The communication system 129 receives information pertaining to a driver of the vehicle 100 (for example, via a transmitter, such as a keyfob, operated by the driver), and preferably communicates via a wireless communication network (not depicted). In certain embodiments, the controller 128 is used to identify the driver (for example, based on a different keyfob or other transmitter used by each driver) for use in adjusting a calibration of the adaptive automatic climate control feature. In certain embodiments, the communication system 129 also obtains inputs from the driver before the driver enters the vehicle 100 as to a desired initial climate control setting, such as an initial temperature setting and/or heated or cooled seat setting when the vehicle is started at the beginning of a current ignition cycle. The communication system 129 provides the information it obtains regarding the driver and/or the driver's preferences to the computer system 132 for processing.

The sensor array 130 includes one or more solar impingement sensors 131, ignition sensors 133, environmental control input sensors 134, and temperature sensors 136. The solar impingement sensors 131 measure a solar impingement of the sun on the vehicle 100, and provide such information (and/or signals pertaining thereto) to the computer system for processing. The ignition sensors 133 detect whether a vehicle ignition has been turned on or off, and provide such information (and/or signals pertaining thereto) to the computer system 132 for processing.

The environmental control input sensors 134 obtain information from a vehicle occupant (such as a driver of the vehicle) as to one or more climate control preferences of the driver after the driver enters the vehicle 100, such as whether air conditioning, air heating, seat heating, and/or seat cooling are desired, and/or a desired temperature, fan level, and/or other setting (for example, low versus high) desired by the driver or other vehicle occupant. In certain embodiments, the environmental control input sensors 134 are part of a user input climate control panel of the vehicle 100. In one embodiment, the environmental control input sensors 134 are coupled to one or more switches, knobs, and/or other user interfaces disposed on or near a dashboard of the vehicle 100. The environmental control input sensors 134 provide such information (and/or signals pertaining thereto) to the computer system 132 for processing.

The temperature sensors 136 include one or more outside air temperature sensors 138 and one or more inside air temperature sensors 140. The outside air temperature sensors 138 are preferably disposed outside the body 102 of the vehicle 100, and measure an outside air temperature outside the vehicle 100 (preferably, of ambient air just outside the vehicle 100). The inside air temperature sensors 140 are preferably disposed inside the body 102 of the vehicle 100, and measure an inside air temperature inside the vehicle 100 (preferably, inside the cabin 103 of the vehicle 100). In certain embodiments, one or more additional temperature sensors 141 measure temperature values from one or more other locations of the vehicle, such as system ducts of the vehicle. The temperature sensors 136 provide such information (and/or signals pertaining thereto) to the computer system 132 for processing.

The computer system 132 is coupled to the communication system 129 and the sensor array 130, along with the compressor 120, the heat exchanger 122, the fan 124, and the seat delivery mechanism 126, and controls the operation thereof. The computer system 132 receives the information from the communication system 129 and the sensor array 130, uses this information to make adjustments to one or more climate control features of the vehicle 100 (such as heated or cooled seats, automatic air conditioning, and/or automatic air heating), and controls operation of the compressor 120, the heat exchanger 122, the fan 124, and/or the seat delivery mechanism in accordance with the adjustments, preferably in accordance with the steps of the process 200 described further below in connection with FIGS. 2-11.

In the depicted embodiment, the computer system 132 includes a processor 142, a memory 144, an interface 146, a storage device 148, and a bus 149. The processor 142 performs the computation and control functions of the controller 128, and may comprise any type of processor or multiple processors, single integrated circuits such as a microprocessor, or any suitable number of integrated circuit devices and/or circuit boards working in cooperation to accomplish the functions of a processing unit. During operation, the processor 142 executes one or more programs 150 contained inside the memory 144 and, as such, controls the general operation of the controller 128 and the computer system 132, preferably in executing the steps of the processes described herein, such as the steps of the process 200 described further below in connection with FIGS. 2-11.

The memory 144 can be any type of suitable memory. This would include the various types of dynamic random access memory (DRAM) such as SDRAM, the various types of static RAM (SRAM), and the various types of non-volatile memory (PROM, EPROM, and flash). The bus 149 serves to transmit programs, data, status and other information or signals between the various components of the computer system 132. In a preferred embodiment, the memory 144 stores the above-referenced program 150 along with one or more stored values 152, preferably including various look-up tables and graphical representations for providing climate control for the vehicle 100, as described further below in connection with FIGS. 2-11. In certain examples, the memory 144 is located on and/or co-located on the same computer chip as the processor 142.

The interface 146 allows communication to the computer system 132, for example from a system driver and/or another computer system, and can be implemented using any suitable method and apparatus. It can include one or more network interfaces to communicate with other systems or components. The interface 146 may also include one or more network interfaces to communicate with technicians, and/or one or more storage interfaces to connect to storage apparatuses, such as the storage device 148.

The storage device 148 can be any suitable type of storage apparatus, including direct access storage devices such as hard disk drives, flash systems, floppy disk drives and optical disk drives. In one exemplary embodiment, the storage device 148 comprises a program product from which memory 144 can receive a program 150 that executes one or more embodiments of one or more processes of the present disclosure, such as the steps of the process 200 of FIGS. 2-11, described further below. In another exemplary embodiment, the program product may be directly stored in and/or otherwise accessed by the memory 144 and/or a disk (e.g., disk 154).

The bus 149 can be any suitable physical or logical means of connecting computer systems and components. This includes, but is not limited to, direct hard-wired connections, fiber optics, infrared and wireless bus technologies. During operation, the program 150 is stored in the memory 144 and executed by the processor 142.

It will be appreciated that while this exemplary embodiment is described in the context of a fully functioning computer system, those skilled in the art will recognize that the mechanisms and processes of the present disclosure are capable of being distributed as a program product with one or more types of non-transitory computer-readable signal bearing media used to store the program and the instructions thereof and carry out the distribution thereof, such as a non-transitory computer readable medium storing the program and containing computer instructions stored therein for causing a computer processor (such as the processor 142) to perform and execute the program. Such a program product may take a variety of forms, and the present disclosure applies equally regardless of the particular type of computer-readable signal bearing media used to carry out the distribution. Examples of signal bearing media include: recordable media such as floppy disks, hard drives, memory cards and optical disks, and transmission media such as digital and analog communication links. It will similarly be appreciated that the computer system 132 may also otherwise differ from the embodiment depicted in FIG. 1, for example in that the computer system 132 may be coupled to or may otherwise utilize one or more remote computer systems and/or other control systems.

Figure 2:
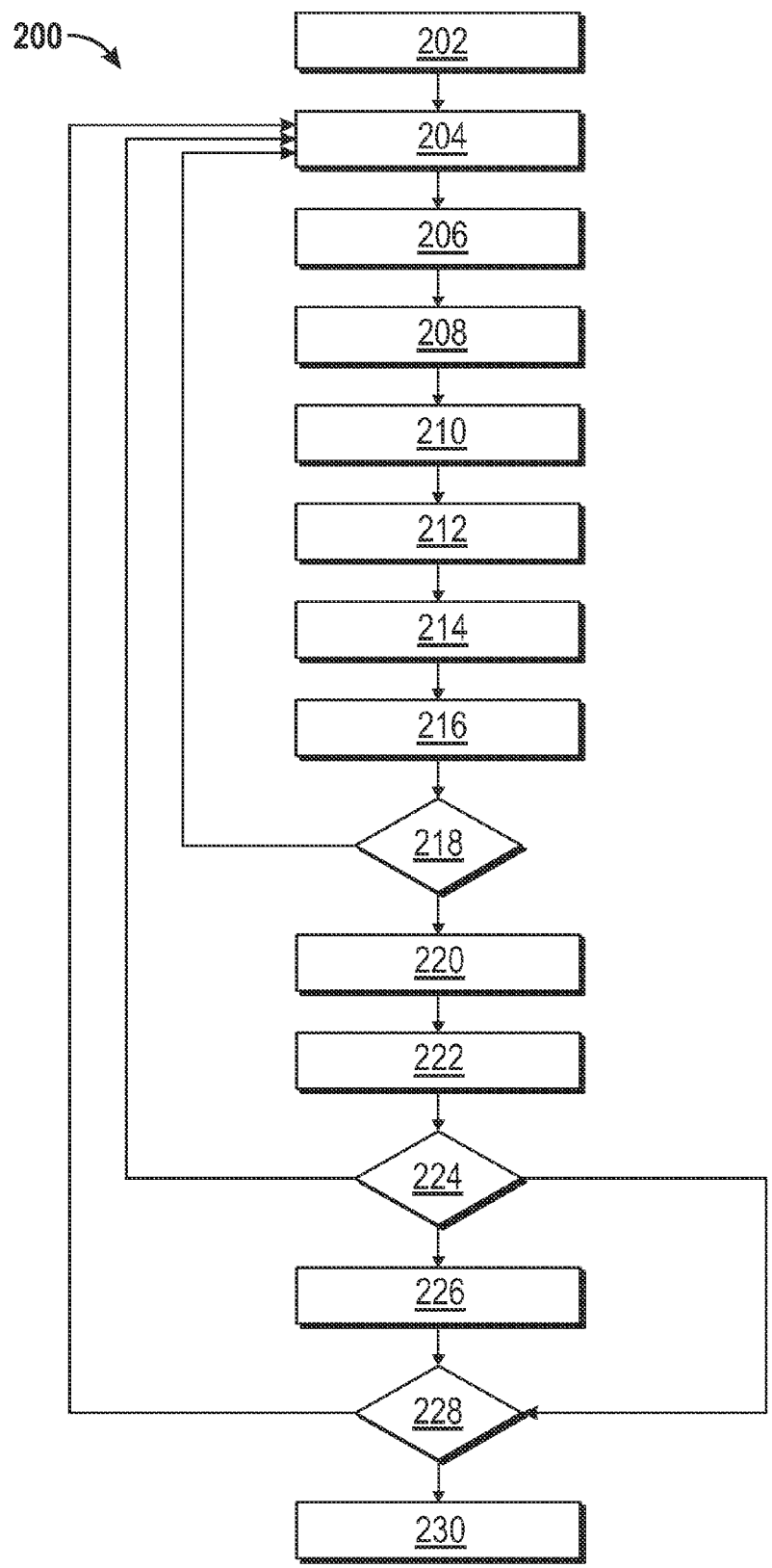
FIG. 2 is a flowchart of a process for providing adaptive automatic climate control functionality, and that can be used in conjunction with the vehicle and the environmental control system of FIG. 1.

FIG. 2 is a flowchart of a process 200 for providing adaptive automatic climate control functionality, in accordance with an exemplary embodiment. The process 200 can be utilized in connection with the vehicle 100, the environmental control system 108, and the controller 128 of FIG. 1, in accordance with an exemplary embodiment. The process 200 will also be discussed below with reference to FIGS. 2-11, which depict illustrative exemplary information pertaining to various steps of the process 200.

As depicted in FIG. 2, the process 200 begins with the step of identifying a driver of the vehicle (step 202). In one embodiment, the identification is made by the processor 142 of FIG. 1 based on information provided by the communication system 129 of FIG. 1. Specifically, the processor 142 makes a correlation between a keyfob identification received by the communication system 129 that corresponds to a particular driver of the vehicle (for example, if each driver of the vehicle generally uses a different keyfob). In other embodiments, the driver may be identified in one or more other manners, such as measuring a force applied to the driver seat and/or one or more other characteristics of the driver. The driver identification is preferably made at or near the beginning of a current ignition cycle.

An outdoor air temperature is measured (step 204). Preferably, an ambient air temperature from just outside the vehicle is measured in step 204 by the outside air temperature sensors 138 of FIG. 1 and provided to the processor 142 for processing. An indoor air temperature is also measured (step 206). In one embodiment, an air temperature from inside the cabin 103 of FIG. 1 is measured in step 206 by the inside air temperature sensors 140 of FIG. 1 and provided to the processor 142 for processing. In other embodiments, the indoor temperature is calculated and/or estimated based on other climate sensors and operating conditions of the vehicle, such as using the solar intensity sensor 131 of FIG. 1, solar angle information (such as obtained via the communication system 129 of FIG. 1), system duct temperature values (obtained from the additional temperature sensors 141 of FIG. 1), vehicle speed (for example, calculated form non-depicted wheel speed sensors of the vehicle), outside air temperature (for example, obtained from the outside air temperature sensors 138 of FIG. 1), a known blower (fan) command, and known air distribution command (e.g. floor, panel, windshield mode). Steps 204 and 206 preferably repeat continuously throughout the process 200.

Climate control inputs are obtained (step 208). The climate control inputs pertain to one or more desired climate control settings as desired by the driver or other vehicle occupant, such as heating versus cooling, a temperature setting, a fan setting, an air distribution setting (e.g., whether the air is directed automatically toward to the floor versus the instrument panel versus the windshield), and a climate controlled seat setting. The climate control inputs are preferably obtained by a driver of the vehicle via the communication system 129 of FIG. 1 (for example, from a driver keyfob) and/or via the environmental control input sensors 134 of FIG. 1 (for example, from a driver interface on or near the dashboard) and provided to the processor 142 of FIG. 1. Step 208 preferably repeats continuously throughout the process 200.

A target indoor temperature for the vehicle is calculated (step 210). The target temperature is preferably calculated by the processor 142 of FIG. 1 based on the inputs from step 208. Specifically, in one embodiment, the processor 142 identifies a target temperature for the vehicle that corresponds to the driver inputs/selections of step 208, and that would meet the driver's expectations based on the driver inputs. For example, if the driver inputs the temperature setting of 70° Fahrenheit in step 208, then in step 210 the processor preferably calculates a temperature (after considering the outside air temperature, solar intensity and the configuration of the vehicle, including the proximity of the hot and cold interior surfaces to the occupants as well as solar impingement on each occupant), such that, once the target temperature is reached, the driver feels as though he or she is in a room setting with uniform thermal conditions with a thermostat set at 70° Fahrenheit. Step 210 preferably repeats continuously throughout the process 200.

A temperature error is calculated (step 212). The temperature error represents a difference between the current inside temperature of step 206 and the target temperature of step 210. The target temperature is preferably calculated by the processor 142 of FIG. 1. Step 212 preferably repeats continuously throughout the process 200.

A climate control curve is obtained (step 214). The climate control calibration curve (also referred to herein as a set of initial calibration values) includes predetermined values used in implementing an automatic climate control feature for the vehicle based on the inputs of step 208. The calibration curve is tailored to the specific driver. In one embodiment, if the driver selects heated seats in step 208, the calibration curve represents a set of values for which the seats will be heated at a certain level at first, and by which the heating will be gradually reduced over a specific period of time (all of which is tailored to the particular driver of other vehicle occupant). The calibration curve is preferably previously stored as one of the stored values 152 in the memory 144 of FIG. 1, and is retrieved by the processor 142 of FIG. 1 during step 214. In one embodiment, the memory 144 stores different calibration curves for each driver of the vehicle, and the processor retrieves, in step 214, the specific calibration curve corresponds to the specific driver identified in step 202. In certain embodiments, additional identifications may be made of one or more passengers in the vehicle (such as in the passenger side front side), and a separate calibration curve may also be retrieved and implemented for the passenger for heating the passenger's seat, and the like. In addition, calibration curves may similarly be retrieved and implemented for various other automatic climate control features, such as automatic seat cooling, an automatic temperature setting for air conditioning and/or heating, an automatic air distribution setting for air conditioning and/or heating and a fan setting for air conditioning and/or heating.

Automatic climate control functionality is then initiated (step 216). In one embodiment, heating or cooling of vehicle seating (such as the climate controlled seats 118 of FIG. 1) is initiated in step 216 by the seat delivery mechanism 126 of FIG. 1 via instructions provided by the processor 142 of FIG. 1 based on the outside air temperature of step 204 and the temperature error of step 212. In certain embodiments, various other automatic climate control functionality may similarly be initiated, such as an automatic temperature seating for air conditioning and/or heating and/or an automatic fan setting for air conditioning and/or heating.

Figure 3:
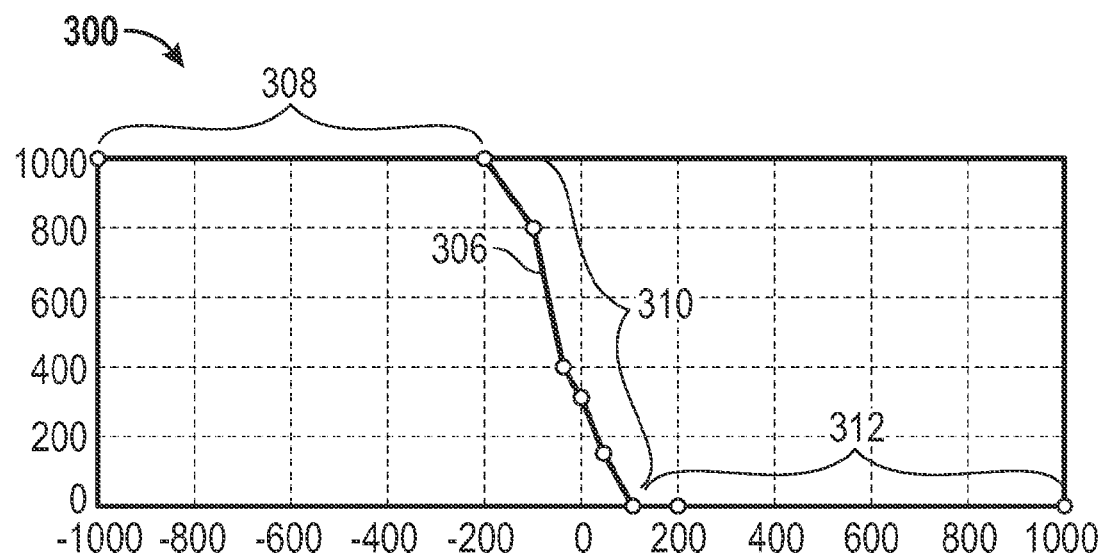
FIGS. 3-11 provide graphical illustrations of exemplary implementations of various steps of the process of FIG. 2, in accordance with an exemplary embodiment.
Figure 4:
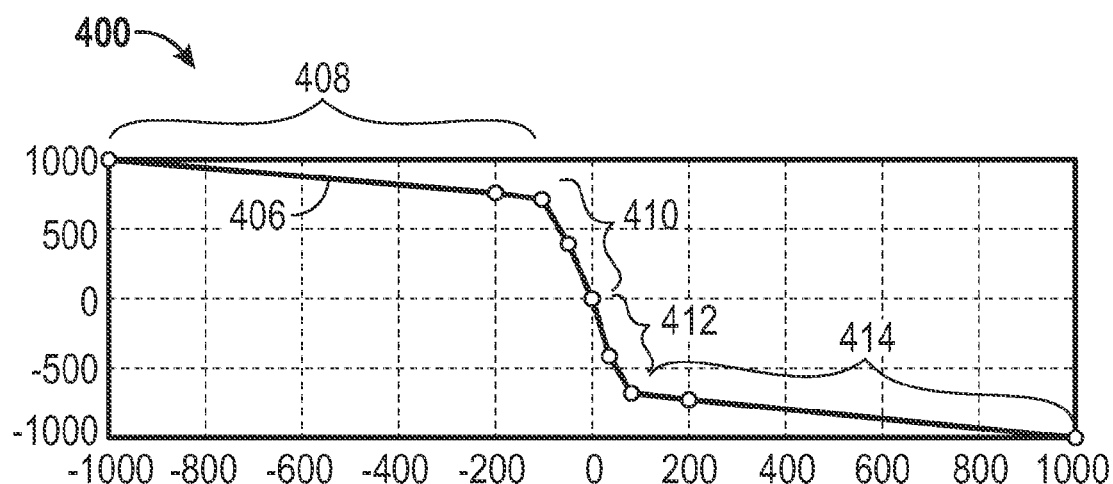
Figure 5:
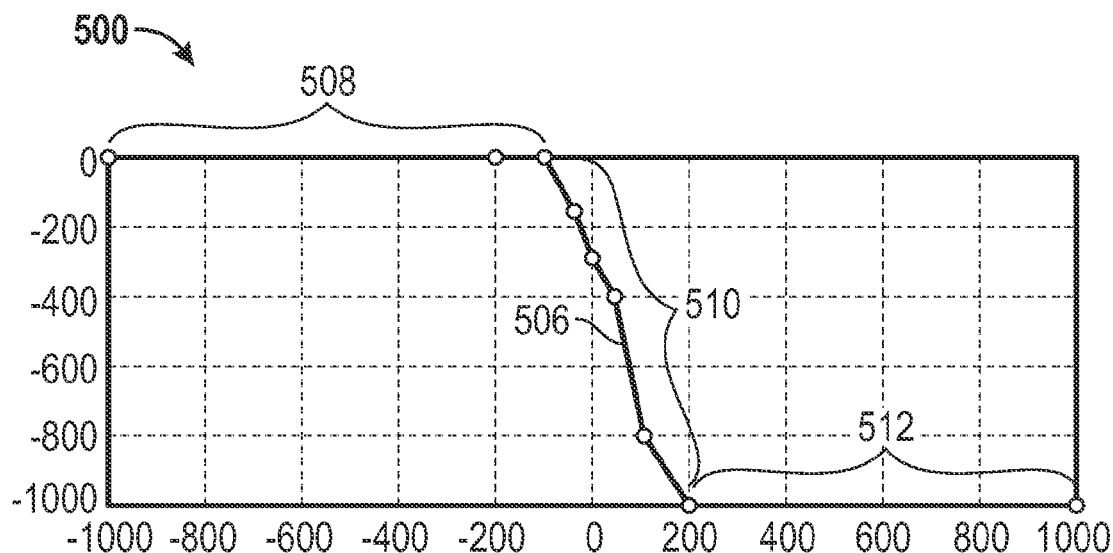

With reference to FIGS. 3-5, the temperature error (in percentage terms, scaled by a factor of ten) is plotted on the x-axis of each graph, while a measure of heating or cooling of the climate controlled seat (also measured in percentage terms, scaled by a factor of ten) is plotted on the y-axis of each graph. These graphs represent look-up tables that are used by the controller 128 of FIG. 1. A different one of the three graphs of FIGS. 3-5 is used, dependent upon the outside air temperature of step 204. Specifically, a low temperature graph 300 of FIG. 3 is used for determining a heating/cooling percentage 306 for a relatively low outside temperature (for example, −20° Celsius in one embodiment), a medium temperature graph 400 of FIG. 4 is used for determining a heating/cooling percentage 406 for a relatively mild outside temperature (for example, 10° Celsius in one embodiment), and a high temperature graph 500 of FIG. 5 is used for determining a heating/cooling percentage 506 for a relatively high outside temperature (for example, 40° Celsius in one embodiment). For temperatures that fall between these thresholds, linear interpolation may be used. For example, if the outside air temperature is −10° Celsius, then a combination of the low temperature graph 300 and the medium temperature graph 400 may be utilized, with additional weight being given to the low temperature graph 300 with the linear interpolation, and the like. As referenced herein, the temperature error of FIGS. 3-5 (also referred to herein as the percentage temperature error) represents the temperature error of step 212 as a percentage of the current inside air temperature of step 206, and the heating/cooling percentage of FIGS. 3-5 represents a heating or cooling of the seats as a percentage of the current inside air temperature of step 206.

As shown in FIG. 3, the low temperature graph 300 provides maximum heating of the seat during a first range 308 when the temperature error is in a relatively high range with a negative sign (representing that the cabin temperature is much colder than desired). For example, in the depicted embodiment, 100% heating is provided when the temperature error is between −20% and −100%. The low temperature graph 300 provides no heating of the seat during a third range 312 when the temperature error is in a relatively high range with a positive sign (representing that the cabin temperature is much warmer than desired) (for example, when the error is between approximately 10% and 100%). The low temperature graph 300 provides variable heating of the seat during a second range 310 when the temperature error is in a relatively middle range between the first and third ranges 308, 312. For example, in the depicted embodiment, variable heating (between 100% and zero) is provided when the temperature error is between −20% and 10%.

As shown in FIG. 4, the medium temperature graph 400 provides variable heating of the seat with a relatively greater amount during a first range 408 when the temperature error is in a relatively high range with a negative sign (representing that the cabin temperature is much colder than desired), and provides variable heating in a relatively lesser amount during a second range 410 when the temperature error is relatively less but still has a negative sign. For example, in the depicted embodiment, variable heating between 100% and approximately 70% is provided when the temperature error is between −100% and approximately −10%, and variable heating between approximately 70% and zero is provided when the temperature error is between approximately −10% and zero. The medium temperature graph 400 provides variable cooling of the seat with a relatively greater amount during a fourth range 414 when the temperature error is in a relatively high range with a positive sign (representing that the cabin temperature is much warmer than desired), and provides variable cooling in a relatively lesser amount during a third range 412 when the temperature error is relatively less but still has a positive sign. For example, in the depicted embodiment, variable cooling between approximately 70% and 100% is provided when the temperature error is between approximately 10% and 100%, and variable cooling between zero and approximately 70% is provided when the temperature error is between zero and approximately 10%.

As shown in FIG. 5, the high temperature graph 500 provides no heating or cooling of the seat during a first range 508 when the temperature error is in a relatively high range (for example, when the temperature difference is less than −10%). The high temperature graph 500 provides maximum cooling of the seat during a third range 512 when the temperature error is in a relatively high range with a positive sign (representing that the cabin temperature is much warmer than desired). For example, in the depicted embodiment, 100% cooling is provided when the temperature error is between approximately 20% and 100%. The high temperature graph 500 provides variable cooling of the seat during a second range 510 when the temperature error is in a relatively middle range between the first and third ranges 508, 512. For example, in the depicted embodiment, variable cooling (between zero and 100%) is provided when the temperature error is between approximately −10% and 20%.

With reference back to FIG. 2, the automatic climate control functionality is provided in accordance with the calibration curve until a determination is made that a manual override has occurred for the automatic climate control functionality (step 218). This determination is preferably made by the processor 142 of FIG. 1 based on information obtained by the input sensors 134 of FIG. 1. This would occur, for example, if the driver or other occupant engaged a button, dial or other input device to either turn off the heated seat or cooled seat (or temperature setting, air distribution setting, fan setting, or other climate control feature) or change a magnitude of the heated seat or cooled seat (or temperature setting, air distribution setting, fan setting, or other climate control feature), such as by turning the setting (e.g., heating or cooling) from "low" to "high", or vice versa. Once such a determination is made, the specific manual setting of the driver or other occupant (such as an increase or decrease in setting for the climate control seat, temperature, or fan level) is detected, and the climate control feature is switched from automatic to manual mode to meet the preferences of the driver or other occupant as reflected by this specific manual setting selected by the driver (step 220). The specific manual setting is preferably detected by one of the input sensors 134 of FIG. 1, and the manual mode is preferably implemented via instructions provided by the processor 142 based on the specific manual setting.

In addition, the calibration curve for the particular driver is adjusted, resulting in a revised set of calibration values (and thus a resulting revised calibration curve) for future use (such is in future ignition cycles, or the occupant changing from manual control back to automatic control) (step 222). The adjustments are preferably made by the processor 142 of FIG. 1. Preferably, a weighted average of values is utilized between the initial values from the initial calibration curve of step 214 and new values representative of the specific manual setting of the manual override. By way of explanation, in one example, if the initial calibration setting called for an automatic heating of the seat to be turned off after five minutes, and the driver manually turns the heating off after one minute, then during the next ignition cycle the heating may be automatically turned off after four minutes. If during the next ignition cycle the driver again turns the heating off after one minute, then during the following ignition cycle the heating may be automatically turned off after three minutes, and so on. Similar adjustments can be made in response to manual overrides of automatic cooled seats, temperature settings, air distribution setting, fan level settings, and/or other climate control functionality.

Further examples are illustrated in FIGS. 6-11 in the heated/seat context, and are described below in connection therewith. It will be understood that similar implementations can be made for automatic temperature settings of air conditioning/heating systems, air distribution setting, automatic fan level settings for air conditioning/heated systems, and/or for other types of automatic climate control functionality.

Figure 6:
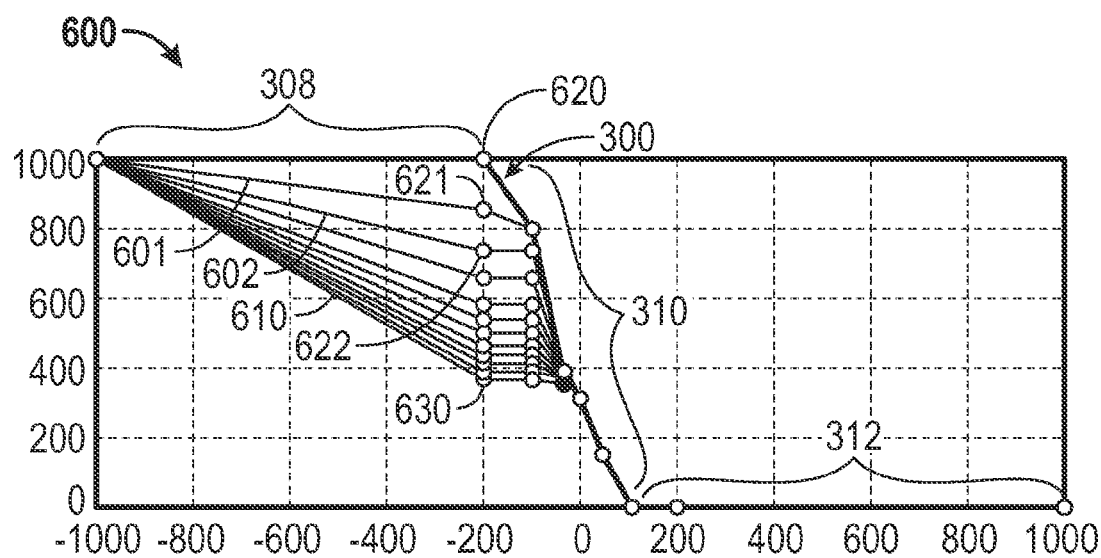

FIG. 6 illustrates an exemplary implementation in which the outside air temperature is relatively cold (corresponding to the low temperature graph 300 of FIG. 3), and in which the heating of the seat is manually turned off or dialed down (e.g., with a changed setting from "high" to "low") by a driver or other occupant of the vehicle to manually override the automatic climate control functionality. After the first iteration in which the driver manually adjusts the heating in this manner, portions of the curve are adjusted downward with a first adjusted curve 601 (so that heating will be reduced more quickly in the next ignition cycle as compared with the initial calibration). If the driver (or other vehicle occupant) continues to manually override the automatic heating of the seat in this manner in subsequent ignition cycles, a second adjusted curve 602 is generated, and so on, until a final adjusted curve 610 is determined (at which point the driver or other occupant is no longer manually overriding the automatic climate control feature). As depicted in FIG. 6, each adjusted curve (601, 602, . . . , 610) includes at least one respective point (621, 622, . . . , 630) that represents a shift downward from a respective calibration point 620 of the initial calibration curve, thereby resulting in a downward shift for this portion of the initial calibration curve (i.e., the portion of the curve that is nearest to the manual override).

Figure 7:
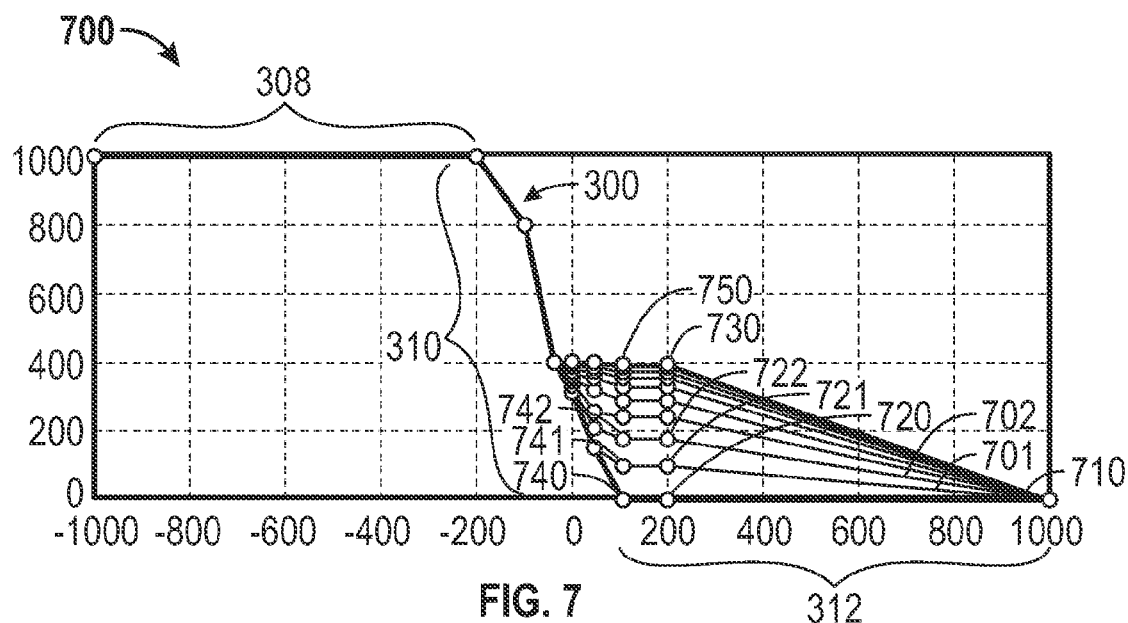

FIG. 7 illustrates an exemplary implementation in which the outside air temperature is relatively cold (corresponding to the low temperature graph 300 of FIG. 3), and in which the heating of the seat is manually turned on again after the heating had been automatically turned off by the automatic system, or in which the heating is dialed up (e.g., with a changed setting from "low" to "high") by a driver or other occupant of the vehicle to manually override the automatic climate control functionality. After the first iteration in which the driver manually adjusts the heating in this manner, portions of the curve are adjusted upward with a first adjusted curve 701 (so that heating will be reduced less quickly in the next ignition cycle). If the driver (or other vehicle occupant) continues to manually override the automatic heating of the seat in this manner in subsequent ignition cycles, a second adjusted curve 702 is generated, and so on, until a final adjusted curve 710 is determined (at which point the driver or other occupant is no longer manually overriding the automatic climate control feature). As depicted in FIG. 7, each adjusted curve (701, 702, . . . , 710) includes respective points (721 and 741 for curve 701, 722 and 742 for curve 702, 730 and 750 for curve 710, and so on), each of which represents a shift upward from a respective calibration point 720 or 740, respectively, of the initial calibration curve, thereby resulting in a upward shift for this portion of the initial calibration curve (i.e., the portion of the curve that is nearest to the manual override).

Figure 8:
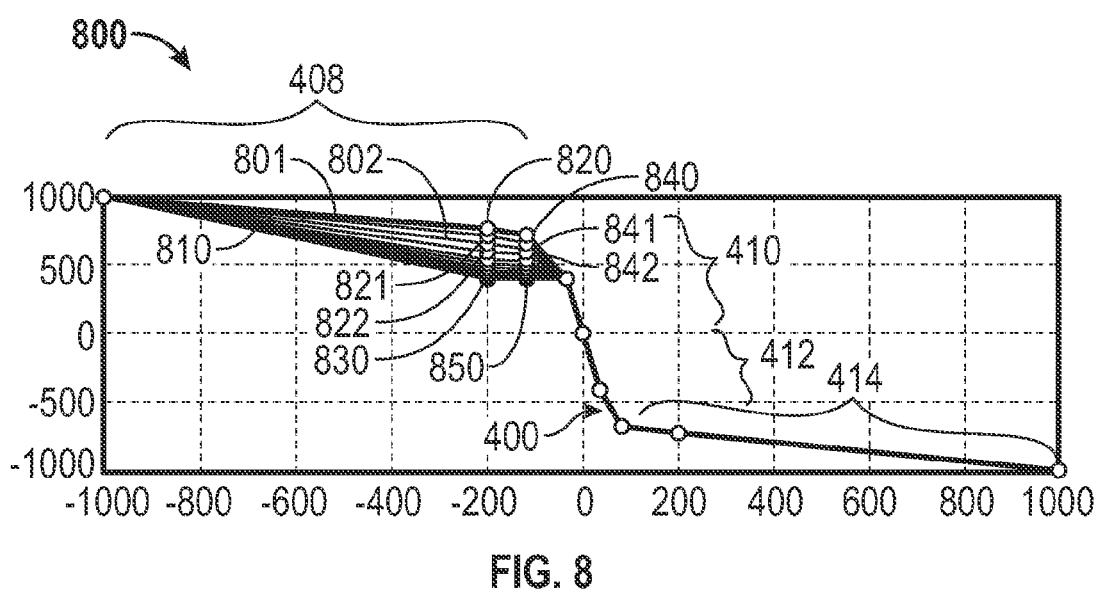

FIG. 8 illustrates an exemplary implementation in which the outside air temperature is relatively mild (corresponding to the medium temperature graph 400 of FIG. 4), and in which the heating of the seat is manually turned off or dialed down (e.g., with a changed setting from "high" to "low") by a driver or other occupant of the vehicle to manually override the automatic climate control functionality. After the first iteration in which the driver manually adjusts the heating in this manner, portions of the curve are adjusted downward with a first adjusted curve 801 (so that heating will be reduced more quickly in the next ignition cycle). If the driver (or other vehicle occupant) continues to manually override the automatic heating of the seat in this manner in subsequent ignition cycles, a second adjusted curve 802 is generated, and so on, until a final adjusted curve 810 is determined (at which point the driver or other occupant is no longer manually overriding the automatic climate control feature). As depicted in FIG. 8, each adjusted curve (801, 802, . . . , 810) includes at least one respective point (821, 822, . . . , 830) that represents a shift downward from a respective calibration point 820 of the initial calibration curve, thereby resulting in a downward shift for this portion of the initial calibration curve (i.e., the portion of the curve that is nearest to the manual override).

Figure 9:
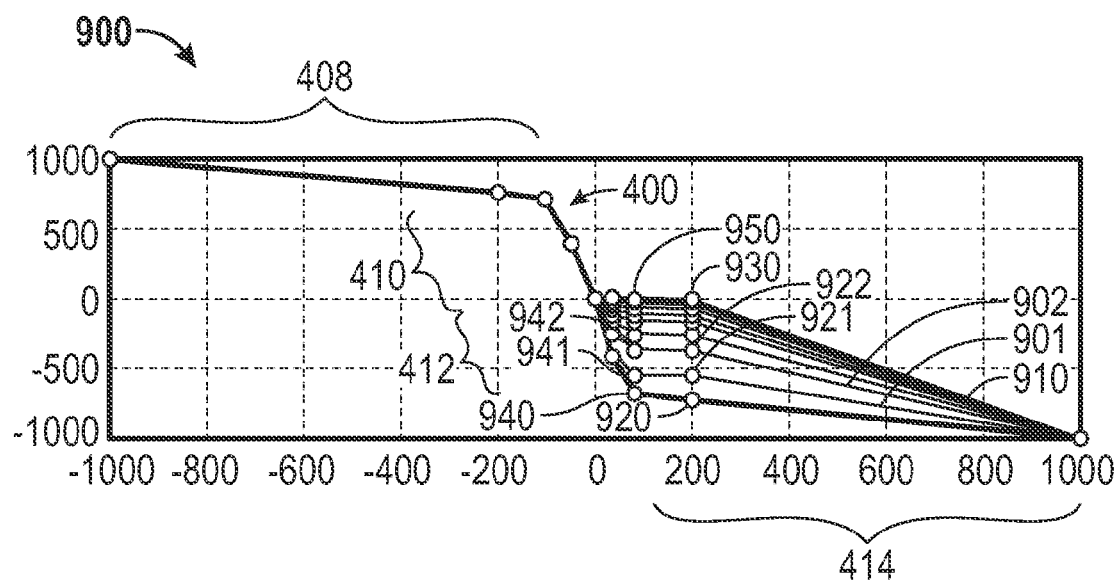

FIG. 9 illustrates an exemplary implementation in which the outside air temperature is relatively mild (corresponding to the medium temperature graph 400 of FIG. 4), and in which the cooling is manually turned off or dialed down (e.g., with a changed cooling setting from "high cooling" to "low cooling") by a driver or other occupant of the vehicle to manually override the automatic climate control functionality. After the first iteration in which the driver manually adjusts the cooling in this manner, portions of the curve are adjusted upward with a first adjusted curve 901 (so that cooling will be increased less quickly in the next ignition cycle). If the driver (or other vehicle occupant) continues to manually override the automatic heating of the seat in this manner in subsequent ignition cycles, a second adjusted curve 902 is generated, and so on, until a final adjusted curve 910 is determined (at which point the driver or other occupant is no longer manually overriding the automatic climate control feature). As depicted in FIG. 9, each adjusted curve (901, 902, . . . , 910) includes respective points (921 and 941 for curve 901, 922 and 942 for curve 902, 930 and 950 for curve 910, and so on), each of which represents a shift upward from a respective calibration point 920 or 940, respectively, of the initial calibration curve, thereby resulting in a upward shift for this portion of the initial calibration curve (i.e., the portion of the curve that is nearest to the manual override).

Figure 10:
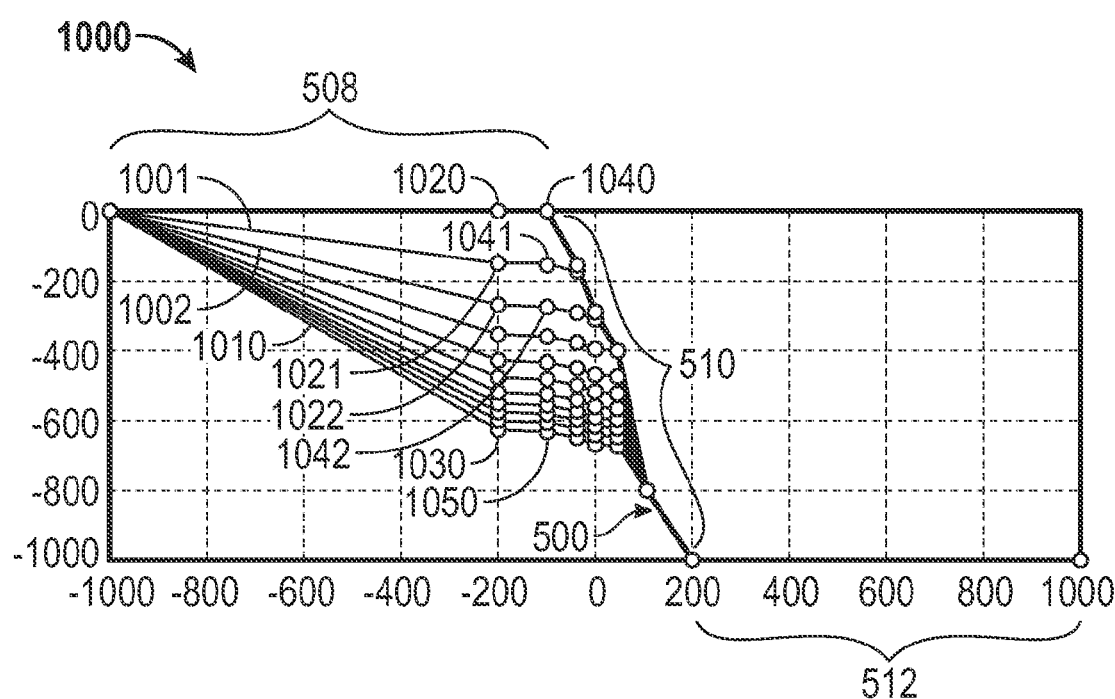

FIG. 10 illustrates an exemplary implementation in which the outside air temperature is relatively warm (corresponding to the high temperature graph 500 of FIG. 5), and in which the cooling of the seat is manually turned on or dialed up (e.g., with a changed setting from "low" to "high") by a driver or other occupant of the vehicle to manually override the automatic climate control functionality. After the first iteration in which the driver manually adjusts the cooling in this manner, portions of the curve are adjusted downward with a first adjusted curve 1001 (so that cooling will be increased more quickly in the next ignition cycle). If the driver (or other vehicle occupant) continues to manually override the automatic cooling of the seat in this manner in subsequent ignition cycles, a second adjusted curve 1002 is generated, and so on, until a final adjusted curve 1010 is determined (at which point the driver or other occupant is no longer manually overriding the automatic climate control feature). As depicted in FIG. 10, each adjusted curve (1001, 1002, . . . , 1010) includes at least one respective point (1021, 1022, . . . , 1030) that represents a shift downward from a respective calibration point 1020 of the initial calibration curve, thereby resulting in a downward shift for this portion of the initial calibration curve (i.e., the portion of the curve that is nearest to the manual override).

Figure 11:
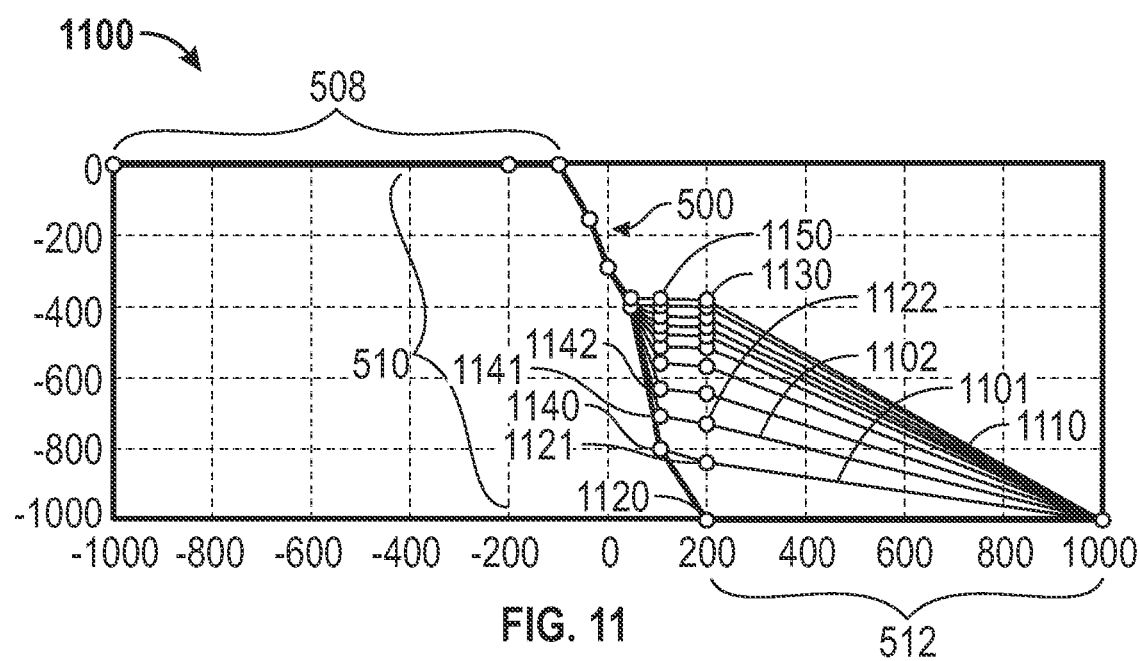

FIG. 11 illustrates an exemplary implementation in which the outside air temperature is relatively warm (corresponding to the high temperature graph 500 of FIG. 5), and in which the cooling is manually turned off or dialed down (e.g., with a changed setting from "high" to "low") by a driver or other occupant of the vehicle to manually override the automatic climate control functionality. After the first iteration in which the driver manually adjusts the cooling in this manner, portions of the curve are adjusted upward with a first adjusted curve 1101 (so that cooling will be increased less quickly in the next ignition cycle). If the driver (or other vehicle occupant) continues to manually override the automatic cooling of the seat in this manner in subsequent ignition cycles, a second adjusted curve 1102 is generated, and so on, until a final adjusted curve 1110 is determined (at which point the driver or other occupant is no longer manually overriding the automatic climate control feature). As depicted in FIG. 11, each adjusted curve (1101, 1102, . . . , 1110) includes respective points (1121 and 1141 for curve 1101, 1122 and 1142 for curve 1102, 1130 and 1150 for curve 1110, and so on), such that each point represents a shift upward from a respective calibration points 1120 and 1140, respectively, of the initial calibration curve, thereby resulting in a upward shift for this portion of the initial calibration curve (i.e., the portion of the curve that is nearest to the manual override). While FIGS. 3-11 depict an exemplary implementation in connection with heating/cooled seats, it will be appreciated that similar implementations may be utilized for other automatic climate control functionality, such as temperature settings and/or fan level settings for air conditioning/heating systems of the vehicle.

In one embodiment, the adjustments to the calibration curves are only implemented if the manual override represents a specific enough departure from the initial calibration for the automatic climate control functionality. Specifically, in one exemplary embodiment using the implementations of FIGS. 3-11, for each potential adjustment to the curve (for example, as represented by adjusted curves 601, 602, . . . 610 of FIG. 6, adjusted curves 701, 702, . . . 710 of FIG. 7, adjusted curves 801, 802, . . . 810 of FIG. 8, adjusted curves 901, 902, . . . 910 of FIG. 9, adjusted curves 1001, 1002, . . . 1010 of FIG. 10, and adjusted curves 1101, 1102, . . . 1110 of FIG. 11), a determination is made as to whether the potentially adjusted curve (or representative values thereof) are sufficiently different from the initial calibration curve (or, the most recently stored adjusted calibration curve, if an adjustment has already been made during a previous ignition cycle) to warrant saving the new adjusted curve in memory (step 224). This determination is preferably made by the processor 142 of FIG. 1. In one embodiment, the adjusted curve is determined to be sufficiently different if the difference between a point on the adjusted curve (e.g., point 622 of curve 602 of FIG. 6) and a corresponding point on the most recently stored curve (e.g., point 621 of curve 601 of FIG. 1) is greater than a predetermined value. In one embodiment, the predetermined threshold is equal to approximately three percent to five percent of the values. However, this may vary in other embodiments.

If the potential adjustment is determined to be sufficiently significant, then the calibration curve is adjusted accordingly (step 226). Specifically, the new potential calibration curve is substituted for the initial calibration curve (or for the most recently previously updated calibration curve), and serves as the new calibration curve. The adjustment is preferably made by the processor 142 of FIG. 1.

A determination is made as to whether the ignition of the vehicle is turned off (step 228). This determination is preferably made by the processor 142 of FIG. 1 based on information obtained from the ignition sensor 133 of FIG. 1. If the ignition has not been turned off, then steps 204-228 repeat. Once a determination is made in an iteration of step 228 that the ignition has been turned off, the updated calibration curve of step 226 is stored in memory (step 230). During step 230, the processor 142 of FIG. 1 preferably stores the updated calibration curve in a long-term memory that will remain through subsequent ignition cycles (most preferably, an EEPROM, or electrically erasable programmable read-only memory, of the memory 144 of FIG. 1). The updated calibration curve is then used as the initial calibration curve for the driver for the next iteration of the process in a subsequent ignition cycle for the vehicle.

Accordingly, improved methods, systems, and vehicles are provided that include adaptive automatic climate control features. Specifically, an automatic climate control feature (such as an automatically heated or cooled seat) is adjusted in a manner that is tailored to the particular driver of the vehicle, based on the driver's history of overriding the automatic climate control feature. The methods, systems, and vehicles may be implemented in connection with the climate controlled seat feature described in detail above, and may similarly be applied with respect to other automatic climate control features, such as a temperature setting for air conditioning/heating of the vehicle, air distribution setting, a fan setting for air conditioning/heating of the vehicle, and the like.

It will be appreciated that the disclosed methods, systems, and vehicles may vary from those depicted in the Figures and described herein. For example, the vehicle 100, the environmental control system 108, the controller 128, and/or various components thereof may vary from that depicted in FIG. 1 and described in connection therewith. In addition, it will be appreciated that certain steps of the process 200 may vary from those depicted in FIGS. 2-11 and/or described above in connection therewith. It will similarly be appreciated that certain steps of the process described above may occur simultaneously or in a different order than that depicted in FIGS. 2-11 and/or described above in connection therewith.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method, comprising:
  initiating an automatic climate control feature for a vehicle using an initial set of calibration values;
  detecting by a sensor, whether a manual override of the automatic climate control feature has occurred;
  detecting by the sensor, a manual setting corresponding to the manual override;
  calculating, using a processor coupled to the sensor, a revised set of calibration values as a weighted average between the initial set of calibration values and a second set of values corresponding to the manual setting when the manual override has been detected; and
  adjusting a calibration of the automatic climate control feature using the revised set of calibration values when the manual override has been detected,
  wherein:
  the step of initiating the automatic climate control feature comprises automatically heating or cooling a seat of the vehicle using an initial calibration curve;
  the step of detecting whether the manual override of the automatic climate control feature has occurred comprises the step of detecting whether an occupant of the vehicle has manually adjusted automatic heating or cooling of the seat; and
  the step of adjusting the calibration of the automatic climate control feature further comprises updating the initial calibration curve using the revised set of calibration values, generating an updated calibration curve for use in subsequent initiation of the automatic climate control feature, wherein the updated calibration curve represents an upward or downward shift in the initial calibration curve proximate a point on the initial calibration curve in which the manual override occurred, and the step of adjusting the calibration comprises adjusting the calibration of the automatic control feature for subsequent automatic heating or cooling of the seat using the revised set of calibration values when the manual override has been detected.

2. The method of claim 1, further comprising:
  using the revised set of calibration values instead of the initial set of calibration values for subsequent initiation of the automatic climate control feature.

3. The method of claim 1, further comprising:
  detecting whether an ignition of the vehicle has been turned off; and
  storing the updated calibration curve when the ignition has been turned off.

4. The method of claim 1, further comprising:
  identifying a current driver of the vehicle;
  wherein:
    the step of initiating the automatic climate control feature comprises initiating the automatic climate control feature using a selected one of a plurality of initial calibration curves corresponding to the current driver, wherein each of the plurality of initial curves corresponds to a different driver of the vehicle, and the selected one of the plurality of initial calibration curves corresponds to the current driver; and
    the step of adjusting the calibration of the automatic climate control feature further comprises updating the selected one of the plurality of initial calibration curves using the revised set of calibration values, for use in subsequent initiation of the automatic climate control feature for the current driver.

5. The method of claim 1, further comprising, subsequent to the calculation of the revised set of calibration values and the adjusting of the calibration using the revised set of calibration values:
  detecting whether a second manual override of the automatic climate control feature has occurred;
  detecting a second manual setting corresponding to the second manual override;
  calculating a second revised set of calibration values as a weighted average between the revised set of calibration values and a third set of values corresponding to the second manual setting when the second manual override has been detected between the revised set of calibration values and the third set of values; and
  adjusting the calibration of the automatic climate control feature using the second revised set of calibration values when the second manual override has been detected.

6. The method of claim 2, wherein:
  the initial set of calibration values provide that the automatic climate control feature will be provided for a first amount of time for an initial initiation of the automatic climate control feature during a first ignition cycle;
  the manual override of the automatic climate control feature is detected to have occurred after a second amount of time following the initial initiation of the automatic climate control feature, wherein the second amount of time is less than the first amount of time; and
  the revised set of calibration values provides that the automatic control will be provided for a third amount of time in the subsequent initiation of the automatic climate control feature in a second ignition cycle, subsequent to the first ignition cycle, wherein the third amount of time is greater than the second amount of time, and wherein the third amount of time is less than the first amount of time.

7. The method of claim 6, wherein:
the manual override of the automatic climate control in the subsequent initiation of the automatic climate control feature in the second ignition cycle is detected to have occurred after a fourth amount of time following the subsequent initiation of the automatic climate control feature in the second ignition cycle, wherein the fourth amount of time is less than the third amount of time; and
a second revised set of calibration values is generated based on the manual override of the subsequent initiation of the automatic climate control feature, the second revised set of calibration values providing that the automatic control will be provided for a fifth amount of time following a second subsequent initiation use of the automatic climate control feature in a third ignition cycle that is subsequent to the second ignition cycle, wherein the fifth amount of time is greater than the fourth amount of time, and wherein the fifth amount of time is less than the third amount of time.

8. A system comprising:
a sensor configured to:
  detect when a manual override of an automatic climate control feature of a vehicle has occurred; and
  detect a manual setting corresponding to the manual override; and
a processor coupled to the sensor and configured to:
  initiate the automatic climate control feature for the vehicle using an initial set of calibration values;
  calculate a revised set of calibration values as a weighted average between the initial set of calibration values and a second set of values corresponding to the manual setting when the manual override has been detected; and
  adjust a calibration of the automatic climate control feature using the revised set of calibration values when the manual override has been detected;
wherein:
  the processor is configured to:
    facilitate automatically heating or cooling a seat of the vehicle using an initial calibration curve; and
    update the initial calibration curve using the revised set of calibration values, generating an updated calibration curve for use in subsequent initiation of the automatic climate control feature, wherein the updated calibration curve represents an upward or downward shift in the initial calibration curve proximate a point on the initial calibration curve in which the manual override occurred;
  the sensor is configured to detect whether an occupant of the vehicle has manually adjusted automatic heating or cooling of the seat; and
  the processor is further configured to facilitate subsequent automatic heating or cooling of the seat using the revised set of calibration values when the manual override has been detected.

9. The system of claim 8, wherein the processor is configured to:
identify a current driver of the vehicle;
initiate the automatic climate control feature using a selected one of a plurality of initial calibration curves corresponding to the current driver, wherein each of the plurality of initial curves corresponds to a different driver of the vehicle, and the selected one of the plurality of initial calibration curves corresponds to the current driver; and
update the selected one of the plurality of initial calibration curves using the revised set of calibration values, for use in subsequent initiation of the automatic climate control feature for the current driver.

10. The system of claim 8, wherein:
the processor is configured to use the revised set of calibration values instead of the initial set of calibration values for subsequent initiation of the automatic climate control feature;
the initial set of calibration values provide that the automatic climate control feature will be provided for a first amount of time for an initial initiation of the automatic climate control feature during a first ignition cycle;
the manual override of the automatic climate control feature is detected to have occurred after a second amount of time following the initial initiation of the automatic climate control feature, wherein the second amount of time is less than the first amount of time; and
the revised set of calibration values provides that the automatic control will be provided for a third amount of time in the subsequent initiation of the automatic climate control feature in a second ignition cycle, subsequent to the first ignition cycle, wherein the third amount of time is greater than the second amount of time, and wherein the third amount of time is less than the first amount of time.

11. The system of claim 10, wherein:
the manual override of the automatic climate control in the subsequent initiation of the automatic climate control feature in the second ignition cycle is detected to have occurred after a fourth amount of time following the subsequent initiation of the automatic climate control feature in the second ignition cycle, wherein the fourth amount of time is less than the third amount of time; and
a second revised set of calibration values is generated based on the manual override of the subsequent initiation of the automatic climate control feature, the second revised set of calibration values providing that the automatic control will be provided for a fifth amount of time following a second subsequent initiation use of the automatic climate control feature in a third ignition cycle that is subsequent to the second ignition cycle, wherein the fifth amount of time is greater than the fourth amount of time, and wherein the fifth amount of time is less than the third amount of time.

\* \* \* \* \*